United States Patent
Machac, Jr. et al.

(10) Patent No.: US 6,482,270 B1
(45) Date of Patent: Nov. 19, 2002

(54) PAINT AND COATING REMOVER

(75) Inventors: James R. Machac, Jr., Austin, TX (US); Edward T. Marquis, Austin, TX (US); Susan A. Woodrum, Austin, TX (US); Katty Darragas, Oudenaarde (BE)

(73) Assignee: Huntsman Petrochemical Corporation, Austin, TX (US)

( * ) Notice: Subject to any disclaimer, the term of this patent is extended or adjusted under 35 U.S.C. 154(b) by 0 days.

(21) Appl. No.: 09/704,001

(22) Filed: Nov. 1, 2000

Related U.S. Application Data

(63) Continuation of application No. 09/335,597, filed on Jun. 18, 1999, now Pat. No. 6,159,915.

(51) Int. Cl.$^7$ .............................. C09D 9/00; C11D 7/12
(52) U.S. Cl. ...................... 134/38; 510/174; 510/201; 510/202; 510/407; 510/493
(58) Field of Search ................................ 510/201, 174, 510/202, 407, 493; 134/38

(56) References Cited

U.S. PATENT DOCUMENTS

| | | | | | |
|---|---|---|---|---|---|
| 4,780,235 A | * | 10/1988 | Jackson | ...................... | 252/170 |
| 5,792,278 A | * | 8/1998 | Wojcik | ........................ | 134/38 |
| 6,040,284 A | * | 3/2000 | Marquis et al. | ............. | 510/201 |
| 6,103,682 A | * | 8/2000 | Lallier | ........................ | 510/212 |
| 6,159,915 A | * | 12/2000 | Machac, Jr. et al. | ........ | 510/201 |
| 6,162,776 A | * | 12/2000 | Marquis et al. | ............. | 510/201 |
| 6,169,061 B1 | * | 1/2001 | Machac, Jr. et al. | ........ | 510/201 |
| 6,187,108 B1 | * | 2/2001 | Machac, Jr. et al. | .......... | 134/38 |

* cited by examiner

Primary Examiner—Yogendra N. Gupta
Assistant Examiner—Brian P. Mruk
(74) Attorney, Agent, or Firm—O'Keefe, Egan & Peterman LLP

(57) ABSTRACT

A composition useful as a paint remover. The composition may include a carbonate, a dibasic ester and a mono-ester. The composition may also contain an organic sulfur-containing compound such as dimethyl sulfoxide (DMSO), a glycol ether, a ketone, or combination thereof. The composition may be used in a process for removing paint by applying it to a painted surface. The compositions have several important attributes, including low toxicity and high efficacy in removing paint and coatings.

32 Claims, No Drawings

PAINT AND COATING REMOVER

This is a continuation of application Ser. No. 09/335,597, filed Jun. 18, 1999 U.S. Pat. No. 6,159,915.

BACKGROUND OF INVENTION

This invention relates to compositions for paint and coating removal. More particularly, this invention relates to compositions containing a carbonate such as alkylene carbonate or dialkyl carbonate or both, dibasic ester and a mono-ester.

Paint removing compositions are commonly used in industry, such as for stripping paint from airplane fuselages. Conventional paint remover compositions include methylene chloride, phenol, or caustic. Each of these materials, however, has inherent problems during use. While methylene chloride based compositions are very effective as paint removers, methylene chloride is a highly volatile material which is considered toxic. Similarly, phenol is highly toxic. Furthermore, caustic causes burns and attacks aluminum. Due to the deficiencies and disadvantages of conventional paint removing compositions, new paint removing compositions are highly desirable.

SUMMARY OF INVENTION

The invention provides a solution to one or more of the problems and disadvantages discussed above.

In one broad respect, this invention is a composition useful as a paint remover, comprising: a carbonate, a dibasic ester and a mono-ester. In one embodiment, the composition may also contain an organic sulfur-containing compound, a glycol ether, a ketone, or combination thereof.

In another broad respect, this invention is a process for removing paint, comprising: applying a composition to a painted surface for a time and under conditions effective to cause blistering or bubbling of the paint, wherein the composition comprises a carbonate, a dibasic ester and a mono-ester.

In another broad respect, this invention is a process for removing a coating from a surface, comprising: providing a composition containing a carbonate, a dibasic ester and a mono-ester; adding a thickening agent to the composition and mixing the resulting composition to form a thickened composition; applying the thickened composition to a coated surface for a time sufficient and under conditions effective to separate at least a portion of the coating from the surface; and removing the coating and thickened composition from the surface.

In another broad respect, this invention is a process of the manufacture of a paint stripper, comprising: combining a carbonate, a dibasic ester and a mono-ester in amount and under conditions effective to form a miscible composition. The combining of the components may be effected as by stirring, typically at the ambient atmospheric pressure and temperature. The composition may include additional components as disclosed herein.

The surfaces to be treated may be sealed with a variety of sealants, such as polysulfide, polyurethane, lacquer, epoxy, and the like. The compositions can be used to remove paints and coatings from furniture, automobiles, boats, trains, airplanes, military vehicles, and so forth.

This invention has a number of advantages. For example, the compositions have several important attributes, including low toxicity, high efficacy in removing paint and coatings. It has further been advantageously found that the compositions may be blended with additional co-solvents, activators, corrosion inhibitors, and the like, or may be used directly to effect paint removal. Furthermore, in the case of propylene carbonate, the propylene carbonate breaks down into propylene glycol, which is non-toxic. Hence, the propylene carbonate compositions of this invention are environmentally friendly, particularly as compared to chlorinated hydrocarbons and the like which are commonly used for paint and coating removing. The compositions of this invention may advantageously be of low volatility and free of carcinogenic chemicals.

DETAILED DESCRIPTION OF THE INVENTION

The compositions of this invention contain a carbonate such as alkylene carbonate or dialkyl carbonate or both, dibasic ester and a mono-ester.

The carbonates that may be employed in the practice of this invention include alkylene carbonates and dialkyl carbonates. The alkylene carbonate used in the present invention can contain from 2 to 10 carbon atoms. Representative examples of alkylene carbonates that may be employed in the practice of this invention include ethylene carbonate and propylene carbonate. Mixtures of carbonates may also be employed. In the practice of this invention, alkylene carbonates are preferred, and among the alkylene carbonates propylene carbonate is preferred. The dialkyl carbonate used in the present invention may contain from 3 to 25 carbon atoms. The dialkyl carbonate may be of formula R—$CO_3$—R', wherein R and R' may be the same or different, and may independently in each occurrence be alkyl of from 1 to about 12 carbon atoms. In one embodiment, the dialkyl carbonate may be dimethyl carbonate, diethyl carbonate, or a mixture thereof. The amount of alkylene carbonate, dialkyl carbonate or both used in the practice of this invention may vary widely. Typically the total amount of carbonate is from about 0.1 to about 90 percent by weight of the total composition. In one embodiment, the amount is from about 10 to about 50 percent by weight, preferably from about 15 to about 25 percent by weight.

In general, the DBE used in this invention include aliphatic diesters having a molecular weight of up to about 200. DBE has the advantage of being considered to be safe and of low toxicity. More than one dibasic ester can be used in the present compositions. DBE is a well known material and is currently available commercially. In general, the DBE used in this invention may be described as being a $C_1$ to $C_6$ dialkyl ester of a $C_2$ to $C_{10}$ aliphatic di-acid, and particularly a $C_1$ to $C_4$ dialkyl ester of a $C_2$ to $C_6$ aliphatic di-acid. For example, the DBE used in the practice of this invention may be derived from various di-acids such as from adipic acid, glutaric acid and succinic acid.

The amount of DBE used in the practice of this invention may vary widely. In general, the amount of DBE may be from about 0.1 percent by weight to about 90 percent by weight, more typically in the range from about 5 to about 50 percent by weight. In one embodiment of this invention, the DBE is present in an amount in the range from 15 to about 45 percent by weight of the total composition, preferably from about 20 to about 45 percent.

The mono-esters that may employed in the practice of this invention may vary widely. The mono-esters that may be used in the practice of this invention typically contain up to about 20 carbons. The mono-esters may include other functional groups in the compound. For instance, the mono-esters may also include ether groups, such as methyl, propyl or butyl ether groups. Representative non-limiting examples of esters that may be employed in the practice of this invention include ethyl acetate, butyl acetate, ethyl-3-ethoxy-propionate, propylene glycol methyl ether acetate, propylene glycol butyl ether acetate, dipropylene glycol methyl ether acetate and dipropylene glycol butyl ether acetate. Likewise, cyclic esters such as butyrolactone may be employed in the practice of this invention. Preferred mono-esters include an ether group. Ethyl-3-ethoxy-propionate ("EEP") is a representative preferred mono-ester which is considered to be safe and of low toxicity. The amount of mono-ester used in the practice of this invention may vary widely. Typically the amount is from about 0.1 to about 90 percent by weight of the total composition. In one embodiment, the amount is from about 5 to about 50 percent, preferably from about 15 to about 45 percent, and more preferably from about 20 to about 40 percent.

The organic sulfur-containing compounds that may employed in the practice of this invention may vary widely. The organic sulfur-containing compounds that may be used in the practice of this invention typically contain up to about 20 carbons. The organic sulfur-containing compounds may include other functional groups in the compound. Representative examples of sulfur-containing compounds that may be employed in the practice of this invention include dimethylsulfoxide (DMSO) and sulfolane. DMSO, for instance, is considered to be safe and of low toxicity. The amount of organic sulfur-containing compound used in the practice of this invention may vary widely. Typically the total amount of organic sulfur-containing compound is from about 0.1 to about 50 percent by weight of the total composition. In one embodiment, the amount is from about 5 to about 40 percent by weight, preferably from about 10 to about 30 percent by weight.

The ketones that may be employed in the practice of this invention may vary widely. The ketones that may be used in the practice of this invention typically contain up to about 20 carbons and are typically aliphatic compounds. The ketones may include other functional groups in the compound. Representative non-limiting examples of ketones that may be used in the practice of this invention include acetone, methyl ethyl ketone (MEK), 5-methyl-2-hexanone (MIAK), methyl isobutyl ketone and methyl isoamylbutone. The amount of ketone used in the practice of this invention may vary widely. Typically the total amount of ketone is from about 0.1 to about 50 percent by weight of the total composition. In one embodiment, the amount is from about 5 to about 20 percent by weight, preferably from about 5 to about 15 percent by weight.

The glycol ethers that may employed in the practice of this invention may vary widely. The glycol ethers that may be used in the practice of this invention typically contain up to about 20 carbons. The glycol ethers may include other functional groups in the compound. Representative non-limiting examples of useful glycol ethers include glycol ethers such as propylene glycol methyl ether (PM), dipropylene glycol methyl ether (DPM), or dipropylene glycol n-butyl ether (DPNB), ethylene glycol butyl ether (EB) and dipropylene glycol butyl ether (DB). The amount of glycol ether used in the practice of this invention may vary widely. Typically the total amount of glycol ether is from about 0.1 to about 50 percent by weight of the total composition. In one embodiment, the amount is from about 5 to about 20 percent by weight, preferably from about 5 to about 15 percent by weight.

The compositions of this invention may optionally include an alcohol. Representative examples of such alcohols include methanol, ethanol, propanol, butanol, and benzyl alcohol. In the practice of this invention, benzyl alcohol is preferred. Generally, if alcohol is present, compositions of this invention contain from 0 to about 90 percent by weight alcohol.

In certain embodiments of this invention, the compositions contain from about 10 to about 50 percent by weight of the carbonate, from about 15 to about 45 percent by weight of DBE, and from about 15 to about 45 percent of the mono-ester, with the percentages totaling 100.

In addition to the components described above, it is contemplated that the compositions of this invention may optionally contain activators such as formic or oxalic acid, thickeners, surfactants, acids or bases, stabilizers, corrosion inhibitors, and other additives commonly used in paint removers.

Non-limiting examples of representative thickeners include cellulose ethers such hydroxypropyl cellulose, ethyl cellulose, ethyl hydroxyethyl cellulose, methyl cellulose, and other alkyl or hydroxy alkyl cellulose; silica including colloidal silica; clays such as bentonite and montmorillonite starch; alumina including colloidal alumina; gum arabic; tragacanth; agar; sugar derivatives; high molecular weight polyethylene oxides; guar gum; xanthan gum; polyvinyl pyrrolidone and methyl vinyl ether/maleic anhydride copolymers. It has been found that certain hydroxy alkyl cellulose ethers and certain experimental polymers are particularly effective and resistant to breakdown in the practice of this invention. Such cellulose ethers are available commercially from The Dow Chemical Company under the tradenames Methocel® F4MPRG and Methocel® 311. When a thickener is used, the amount of such thickener can vary depending on the desired level of thickening for the given application. In general, the amount of thickener employed is about 1 to about 4 percent by weight.

Non-limiting examples of representative corrosion inhibitors include ethoxylated butynediol, petroleum sulfonates, blends of propargyl alcohol and thiourea. If used, the amount of such corrosion inhibitors is typically up to about 10% by weight of the total composition.

Non-limiting examples of representative surfactants which may optionally be used in the practice of this invention include non-ionic, anionic, cationic and amphoteric surfactants, such as monocarboxyl cocoimidoazoline, higher alkyl sulfate sodium salts, tridecyloxy poly(alkyleneoxy ethanol), ethoxylated or propoxylated alkyl phenol, alkyl sulfoamides, C10–18 alkaryl sulfonates such as alkylbenzene sulfonates, cocoamphaodipropionate, cetylpalmitic alkanol amides, hydrogenated castor oil, isooctylphenyl polyethoxy ethanol, sorbitan monopalmitate, C8–18 alkyl pyrrolidone, cocoaminoprpionic acid and polyethoxy amino salts thereof. When used, the amount of surfactant should be sufficient to render the composition miscible. If used, the amount of surfactant is typically from about 0.1 to about 10 percent by weight of the total composition.

The compositions of this invention may also optionally contain a wide variety of other organic cosolvents. Likewise, the present invention may be practiced in the absence of one or more of such solvents. Non-limiting examples of representative classes of such other cosolvents include hydrocarbons, ethers, phenols, glycols, lactones, chlorinated hydrocarbons, aromatic hydrocarbons nitrated hydrocarbons and amides. Such cosolvents may be polar or non-polar, may be protic or aprotic, may be cyclic, branched, or straight-chain, and may contain one or more functional groups. Representative examples of common hydrocarbon solvents include hexane, toluene, xylene, and mixtures of aliphatic and aromatic hydrocarbons. Representative examples of common ether solvents include dibutyl ether, ethyl ether, and diphenyl ether. Representative examples of common phenols include phenol and the cresols and resorinols. Representative examples of common glycol solvents include ethylene, propylene and butylene glycols as well as methyl propane diol. Representative examples of common chlorinated hydrocarbon solvents include methylene chloride, methyl chloroform, chlorobenzenes and dichlorobenzenes. Representative examples of common nitrated hydrocarbon solvents include nitroethane and nitropropane. Representative examples of common amide solvents include formamide, dimethyl formamide, acetamide, and dimethylacetamide.

When a given composition containing a given carbonate does not form a miscible composition, a co-solvent may be used to provide a miscible composition. For instance, a glycol ether may be added as a co-solvent in an amount effective to solubilize the components of the mixture. Such glycol ethers may be included for other purposes as well. Such amounts may vary depending on the specific composition of interest, as one of skill in the art may appreciate. The particular type and amount of glycol ether which will afford a miscible composition may be identified by routine experimentation. Also, an alcohol or alkylene carbonate may be beneficially employed as a co-solvent to provide miscible dialkyl carbonate compositions of this invention.

The conditions under which the paint stripping process of this invention may be practiced may vary. Typically, the process will be conducted under ambient atmospheric conditions. Temperatures from 0° F. to about 125° F., although higher temperatures may be used. The paint remover composition may be applied by any convenient method such as by dipping, spraying, or brushing the composition onto the paint surface. For resistant painted surfaces it may be desirable to apply the composition two or more times to fully separate the paint from the surface. It may be desirable to use a rag, scraper, sand blaster, or the like to fully remove paint chips from the surface after the paint remover composition has been given time to fully act. Alternatively, high pressure water spray may be employed to remove paint chips and residual paint remover composition. It may be appreciated that the time required for the paint remover composition to act will vary due to a variety of factors such as temperature, paint type, and particular paint remover formulation being used. In general, application times are between one minute and one hour, although longer application times may be used.

The following examples are illustrative of this invention and are not intended to be limit the scope of the invention or claims hereto. Unless otherwise denoted all percentages are by weight. In the tables, "N/A" denotes "not available;" "PC" denotes propylene carbonate; EC-50 denotes a 50/50 blend of propylene carbonate and ethylene carbonate; EEP denotes ethyl-3-ethoxy propionate; and the thickener was Methocel™ 311.

EXAMPLE

Sample compositions A–F were prepared by combining them in a container with stirring. The percentages of respective components of Samples A–F are shown in Table 1.

TABLE 1

| Sample | PC % | EC-50 % | DMSO % | DBE % | EEP % | DPM % | MIAK % | Thickener % |
|---|---|---|---|---|---|---|---|---|
| A | 19.5 | 0 | 0 | 40.5 | 40 | 0 | 0 | 0 |
| B | 0 | 19.5 | 0 | 40.5 | 40 | 0 | 0 | 0 |
| C | 19.5 | 0 | 22.5 | 34.5 | 23.5 | 0 | 0 | 0 |
| D | 19.5 | 0 | 20.5 | 20.5 | 20 | 10.5 | 9 | 0 |
| E | 19 | 0 | 22 | 34 | 23 | 0 | 0 | 2 |
| F | 19 | 0 | 20 | 20 | 20 | 10 | 9 | 2 |

Samples A–F were then tested in several experiments for their efficacy in paint stripping applications. The results are shown in Table 2. In Table 2, the results are in minutes.

The compositions were applied to panels which were painted with primer and two to three coats of the described paint. The panels were aged for 1.5 to 2 years before being used in the tests.

TABLE 2

| Sample | Test 1 Varnished hardwood | Test 2 Latex on wood | Test 3 Latex enamel on wood | Test 4 Acrylic enamel on metal | Test 5 Latex enamel on metal | Test 6 Acrylic lacquer primer and finish |
|---|---|---|---|---|---|---|
| A | 11.93 | 1.08 | 1.75 | 1.53 | 2.47 | 13.13 |
| B | 9.3 | 2.58 | 0.87 | 2.77 | 5.77 | 14.63 |
| C | 4.72 | 2.53 | 2.22 | 4.9 | 3.05 | 7.28 |
| D | 7.03 | 2.15 | 2.67 | 5.52 | 4.83 | 12.3 |
| E | 2.9 | 2.98 | 2.43 | 4.68 | 2.98 | 10.58 |
| F | 2.8 | 2.75 | 2.75 | 1.2 | 1.53 | 11.1 |

The data in Table 2 shows that the amount of time in minutes the formulations required to remove the coating. These rapid stripping times are analogous to times required for methylene chloride based paint strippers to remove the same coatings. These formulations perform as well as the more dangerous methylene chloride and NMP based formulations but are much safer and environmentally friendly.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as illustrative embodiments. Equivalent elements or materials may be substituted for those illustrated and described herein, and certain features of the invention may be utilized independently of the use of other features, all as would be apparent to one skilled in the art after having the benefit of this description of the invention.

What is claimed is:

1. A process for removing paint, comprising: applying a composition to a painted surface for a time and under conditions effective to cause blistering or bubbling of the paint, wherein the composition comprises a carbonate, a dibasic ester and a mono-ester, an organic sulfur-containing compound, a thickener, and optionally a ketone, optionally a glycol ether, optionally an alcohol, and optionally an activator.

2. The process of claim 1, wherein the carbonate is an alkylene carbonate containing from 2 to 10 carbon atoms.

3. The process of claim 1, wherein the carbonate is propylene carbonate or ethylene carbonate or both.

4. The process of claim 1, wherein the carbonate is ethylene carbonate or propylene carbonate.

5. The process of claim 1, wherein the glycol ether is present.

6. The process of claim 1, wherein the glycol ether is present and the glycol ether has up to 20 carbon atoms.

7. The process of claim 1 wherein the ketone is present.

8. The process of claim 1, wherein the ketone is present and the ketone has up to 20 carbon atoms.

9. The process of claim 1, wherein the organic sulfur-containing compound is dimethyl sulfoxide.

10. The process of claim 1, wherein the mono-ester includes an ether group.

11. The process of claim 1, wherein the mono-ester is ethyl-3-ethoxy-propionate.

12. The process of claim 1, wherein the composition contains from about 10 to about 50 percent by weight of the carbonate, from about 15 to about 45 percent by weight of the dibasic ester, and from about 15 to about 45 percent of the mono-ester.

13. The process of claim 1, wherein the composition contains from about 10 to about 50 percent by weight of the carbonate, from about 15 to about 45 percent by weight of the dibasic ester, from about 15 to about 45 percent of the mono-ester and from about 10 to about 30 percent of the organic sulfur-containing compound.

14. The process of claim 1, wherein the glycol ether and the ketone are present and wherein the composition contains from about 10 to about 50 percent by weight of the carbonate, from about 15 to about 45 percent by weight of the dibasic ester, from about 15 to about 45 percent of the mono-ester, from about 10 to about 30 percent of the sulfur-containing compound, from about 5 to about 20 percent of the ketone, and from 5 percent to about 20 percent of the glycol ether.

15. A process for removing a coating from a surface, comprising:

providing a composition comprising a carbonate, a dibasic ester, an organic-sulfur containing compound, and a mono-ester, and optionally a ketone, optionally a glycol ether, and optionally an alcohol;

adding a thickening agent to the composition and mixing the resulting composition to form a thickened composition;

applying the thickened composition to a coated surface for a time sufficient and under conditions effective to separate at least a portion of the coating from the surface; and removing the coating and thickened composition from the surface.

16. A process for removing paint, comprising: applying a composition to a painted surface for a time and under conditions effective to cause blistering or bubbling of the paint, wherein the composition comprises a carbonate, a dibasic ester, a mono-ester, and an organic sulfur-containing compound.

17. The process of claim 16, wherein the carbonate is an alkylene carbonate containing from 2 to 10 carbon atoms.

18. The process of claim 16, wherein the carbonate is propylene carbonate or ethylene carbonate or both.

19. The process of claim 16, wherein the carbonate is ethylene carbonate or propylene carbonate.

20. The process of claim 16, wherein the composition further comprises a glycol ether.

21. The process of claim 16, wherein the composition further comprises a glycol ether having up to 20 carbon atoms.

22. The process of claim 16, wherein the composition further comprises a ketone.

23. The process of claim 16, wherein the composition further comprises a ketone having up to 20 carbon atoms.

24. The process of claim 16, wherein the organic sulfur-containing compound is dimethyl sulfoxide.

25. The process of claim 16, wherein the mono-ester includes an ether group.

26. The process of claim 16, wherein the mono-ester is ethyl-3-ethoxy-propionate.

27. The process of claim 16, wherein the composition contains from about 10 to about 50 percent by weight of the carbonate, from about 15 to about 45 percent by weight of the dibasic ester, and from about 15 to about 45 percent of the mono-ester.

28. The process of claim 16, wherein the composition contains from about 10 to about 50 percent by weight of the carbonate, from about 15 to about 45 percent by weight of the dibasic ester, from about 15 to about 45 percent of the mono-ester and from about 10 to about 30 percent of the organic sulfur-containing compound wherein the organic sulfur-containing compound is dimethyl sulfoxide.

29. The process of claim 16, wherein the composition contains from about 10 to about 50 percent by weight of the carbonate, from about 15 to about 45 percent by weight of the dibasic ester, from about 15 to about 45 percent of the mono-ester, from about 10 to about 30 percent of the sulfur-containing compound, from about 5 to about 20 percent of a ketone, and from about 5 percent to about 20 percent of a glycol ether.

30. The process of claim 15, wherein the organic sulfur-containing compound is dimethyl sulfoxide.

31. The process of claim 30, wherein the carbonate is an alkylene carbonate having from 2 to 10 carbon atoms.

32. The process of claim 31, wherein the alkylene carbonate is propylene carbonate.

\* \* \* \* \*